United States Patent [19] [11] 3,729,146
Miller [45] Apr. 24, 1973

[54] MAGNETIC TAPE TRANSFER SYSTEM

[75] Inventor: Robert N. Miller, Dallas, Tex.
[73] Assignee: International Computer Products, Inc., Addison, Tex.

[22] Filed: Nov. 19, 1970
[21] Appl. No.: 91,081

[52] U.S. Cl. ....................242/67.4, 242/203
[51] Int. Cl. ....................B65h 17/02
[58] Field of Search ....................242/67.4, 201–204; 274/4 R, 4 D, 11 R, 11 D; 318/7

[56] References Cited

UNITED STATES PATENTS

| | | | |
|---|---|---|---|
| 3,104,071 | 9/1963 | Newberg | 242/203 |
| 3,545,766 | 12/1970 | Osborn | 274/4 D |
| 2,998,939 | 9/1961 | Scott | 242/188 |

*Primary Examiner*—Leonard D. Christian
*Attorney*—Giles C. Clegg, Jr.

[57] ABSTRACT

A method and apparatus for driving reels of the tape cassette wherein one motor is connected directly to one reel and supplied with power continuously to drive the reel in a direction to take up tape. A second motor is coupled to a second reel through a speed reducing mechanism providing a mechanical advantage. Both direction of rotation and speed of the second motor are controlled to effect a control transfer of tape between the two reels while the first motor slips.

17 Claims, 5 Drawing Figures

Patented April 24, 1973

3,729,146

4 Sheets-Sheet 1

INVENTOR
ROBERT N. MILLER

[signature]
ATTORNEY

Patented April 24, 1973 3,729,146

4 Sheets-Sheet 2

*INVENTOR*
ROBERT N. MILLER

*ATTORNEY*

INVENTOR
ROBERT N. MILLER

ATTORNEY

INVENTOR
ROBERT N. MILLER

Gil. C. Clegg Jr.
ATTORNEY

MAGNETIC TAPE TRANSFER SYSTEM

BACKGROUND OF THE INVENTION

The present invention relates to the transfer of material between a pair of material transfer devices and, more particularly, to the transfer of tape between storage reels of a cassette type tape recorder.

The storage of digital data on magnetic tape has become widespread. Magnetic tape is commonly sorted on two reels with the tape transferred in one direction at a desired speed in order to read or write information. The tape speed is controlled either by a capstan drive or by controlling the speed at which the reel performing a take-up function is being driven.

In the capstan drive systems, tape is pulled past the magnetic read or write heads at a constant speed determined by the angular velocity of a rotating capstan driven by constant speed motor. The supply reel is generally permitted to rotate substantially freely and the take-up roller is driven at a speed sufficient to insure that slack is not produced in the tape between the take-up reel and the capstan. Such systems are most widespread in the larger tape systems but have been adapted to use in cassette type systems. Such systems are generally more complex than systems in which the reels are driven and are difficult to adapt to cassette type tape recorders.

In cassette type systems, it is also common to drive the reel which is functioning as the take-up reel. In some commercial devices the drive unit is disconnected from the reel functioning as the supply reel, permitting the supply reel to rotate freely. Various modifications of such systems have been made, some of which permit the supply reel to be driven at a reduced rate as compared with the take-up reel and others of which provide selective braking in order to prevent an excessive amount of loose tape becoming available between the two reels.

The present invention provides a new and improved method and apparatus for material transfer wherein one reel is driven at all times in the direction to tend to transfer tape onto said reel. The drive motor is suitably connected either directly or through a slip clutch to such reel in order that such reel tends to be driven at a grater speed but lower torque than the other reel. The second reel is connected to a motor through a speed reducing mechanism providing a mechanical advantage, such that if substantially the same amount of power is applied to both motors, the second reel will be driven at the speed which is a function of the speed of the second motor and in a direction controlled by the second motor. In view of the mechanical advantage provided between the second reel and the second motor, the speed of the system will be limited to that provided by the second reel with the loading on the first reel causing the first motor to slip. Since the first motor tends to drive the first reel at a much greater speed than that at which the second motor is driven, positive tension is provided on the tape at all times. The drive mechanism is essentially simpler than that conventionally used in that braking mechanisms are not required, contributing to a lower cost of the cassette drive mechanism and higher reliability. A clock track on the tape is not required to maintain constant speed, but rather suitable speed control circuits which operate independently of external sync pulses can be used.

The method and apparatus of the invention can be used in those applications in which material is to be transferred at a constant linear speed or in those applications wherein the constant angular velocity of the take-up reel is to be provided. However, the method and apparatus of the present invention is especially adaptable to so-called incremental decks wherein the tape drive is operated intermittently to cause tape to be advanced only as required to accept binary data. By causing the number of recorded bits to remain constant with each reel spindle revolution, the number of spindle revolutions can be used to provide a measure of the amount of data recorded. Further, it will be apparent that a count of spindle rotations can also be used to measure data and index tape.

Many objects and advantages of the invention will become apparent to those skilled in the art as a detailed description of the preferred embodiments of the invention unfold in conjunction with the appended drawings wherein like reference numerals denote like parts and in which.

Figure 1:
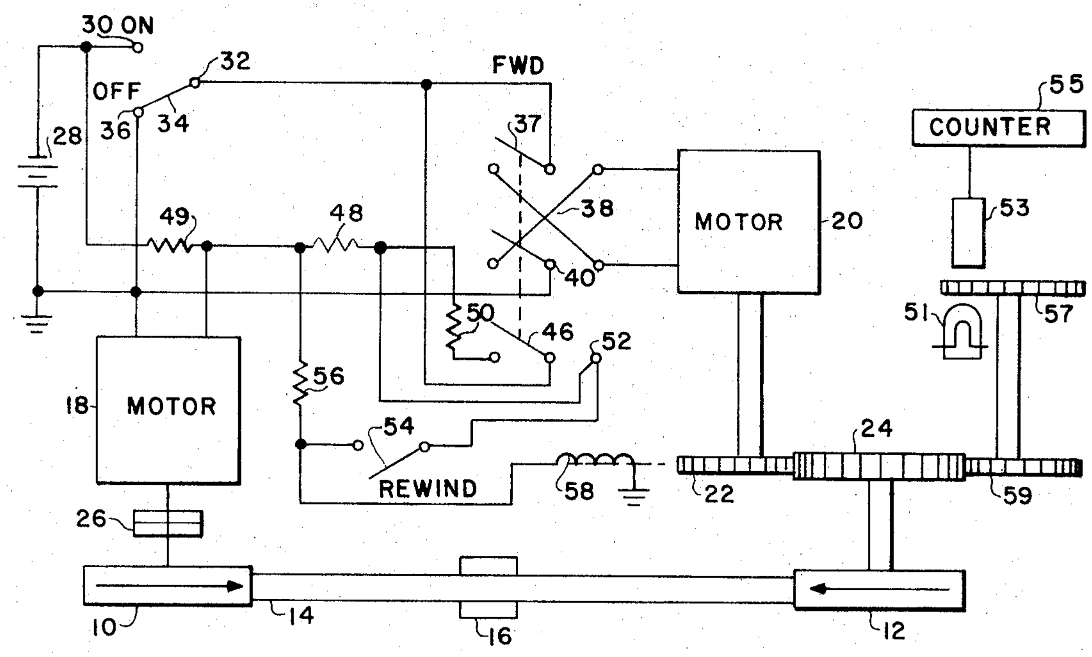
FIG. 1 is a view diagrammatically illustrating the principals of the present invention.

The principles of the invention are diagrammatically illustrated in FIG. 1 of the drawings wherein there is shown a pair of reels 10 and 12 for transporting magnetic tape 14 across magnetic recording-playback head 16. Reel 10 is suitably coupled directly to a motor 18 while reel 12 is coupled to motor 20 through speed reducing gears 22 and 24. It will be readily apparent that if the motors 18 and 20 are substantially identical and receive identical amounts of power, the motor 18 would tend to drive the reel 10 at a greater angular velocity than that which motor 20 would drive the reel 12 but due to the mechanical advantage provided by the gear reducing mechanism comprising the gears 22 and 24 the speed and direction that the tape 14 is moved would be governed by the rotational speed and direction of reel 12, resulting in slippage in motor 18. As is well known in the art, small d.c. motors can operate with substantial amounts of slippage without adverse effect. A slip clutch 26 can be provided between the motor 18 and the reel 10 if desired, however.

The circuit diagrammatically illustrated in FIG. 1 further includes a source of supply voltage indicated as being a battery 28 having one terminal thereof connected to ground and the other terminal connected to a terminal 30 of a switch 32. The armature 34 of switch 32 is switchable between contact 30 and a contact 36 which is also connected to ground. Terminal 32 is connected to one armature 37 of a reversing switch 38 with the other armature 40 of the reversing switch being connected to ground. It can readily be seen that when the reversing switch is in the forward position, the potential of one polarity will be applied to drive motor 20. When the reversing switch is placed in the reverse direction, the polarity of the supply voltage applied to the motor will be reversed, producing reversal of direction of the motor. Terminal 32 is also connected to a third armature 46 of the reversing switch. When the reversing switch is in the forward direction, power is supplied through resistors 48 and 50 to drive motor 18. When the reversing switch is placed in the reverse position, resistor 50 is shunted, increasing the power applied to the motor 18. Contact 52 of the reversing switch is also connected to the armature of a switch 54 used for fast rewind. When the rewind switch 54 is closed, contact 52 is connected through resistor 56, which is effectively in parallel with resistor 48, to motor 18 effectively increasing the power supplied to the motor. Contact 52 is also connected to energize a solenoid 58 which functions to disengage the gear 22 from gear 24 and permits reel 12 to turn without drag imposed by the motor 20.

In operation of the circuit shown in FIG. 1, polarity of the supply voltage applied to the motor 18 is at all times such as to cause the motor 18 to rotate in a direction to drive reel 10 in a clockwise direction, transferring the tape 14 onto reel 10. When switch 38 is in the forward position, the potential supplied to motor 20 is of a polarity to cause the reel 12 to be driven in a counter-clockwise direction, tending to transfer tape 14 onto reel 12. As a consequence, when the switch 38 is in the forward position, and due to the mechanical advantage provided by the speed reducing mechanism comprising gears 22 and 24, reel 12 will rotate in the counter-clockwise direction driving reel 10 in the same sense and transferring the tape from reel 10 to reel 12. The motor 18 will be caused to slip and actually rotate in a direction opposite to that to which it tends to rotate. The potential supplied to the motor 18 will cause it to tend to rotate in the opposite direction and insures that tension will be maintained on the tape 14 at all times. The speed at which the tape moves, will be a function of the angular velocity of the motor 20.

When the switch 38 is placed in the reverse position, the direction of rotation of motor 20 will reverse, causing the reel 12 to rotate in the clockwise direction and permitting tape to be transferred from reel 12 to reel 10. The direction of rotation of reel 10 will be the same as the direction which motor 18 tends to drive the reel and the power supplied to motor 18 is preferably increased, suitable by shunting across resistor 50 to increase the power supplied to the motor. The increase in power supplied to motor 18 is desirable in that rather than merely providing a braking function, the motor 18 must now drive the reel 10 to pull tape from reel 12. It is important to note that due to the mechanical advantage provided by the speed reducing mechanism, the tape speed is controlled as a function of the angular velocity of the motor 20. If a faster rewind is desired, switch 54 can be actuated to disengage the connection between motor 20 and reel 12 permitting the reel 12 to rotate freely. The speed of the tape 14 will then be a function of the power supplied to motor 18. If the power supplied to motor 18 is made large, as by applying power through a smaller resistor 56, motor 18 can be caused to turn at a greater angular velocity transferring the tape from reel 12 to reel 10 very rapidly.

It can readily be seen that except when the rewind switch 54 is operated, the amount of tape transferred between the two reels is a function of the angular displacement and direction of rotation of motor 20. If a byte or bit or block of data is recorded onto the tape each time the motor 20 rotates *n* radians the location of a particular bit of information can be readily established by counting the algebraic sum of *n* radians through which the motor shaft or reel is rotated. Such a count can be obtained, for example, by photoelectric means including a lamp 51 which pulses a photo sensitive device 53 to drive a counter 55 through a mask 57 driven by gear 59. Counter 55 can be connected to count in the reverse direction when switch 38 is in the reverse position in order that the count in the counter will reflect the tape position relative to head 16.

Start-stop switch 32 provides a means of starting and stopping tape movement. When switch armature 34 is connected to pole 30, it receives battery power which is applied to both motors with motor 20 serving to control tape velocity and direction and motor 18 controlling tape tension. When the armature 34 is transferred to the off position, power is removed from both motors and a short circuit is placed across motor 20 for rapid deceleration due to magnetic braking. Because of series resistors 48 and 50, motor 18 has power removed but does not receive short circuit braking. The stopping characteristics of the tape transport are thus determined by the motor 20. In practice it has been found beneficial to include resistor 49 which provides a small current through motor 18 at all times. This resistor is chosen to allow sufficient torque to take up any residual tape slack between head 16 and reel 10 but not enough to overcome the inertia of motor 20 through the gears 22 and 24.

A motor speed control 44 is not essential in all applications, since the cassette loading results in a certain amount of speed regulation. More particularly, when all of the tape is on reel 10, the moment arm on the shaft of motor 18 is the greatest, resulting in minimum braking action. Similarly, the diameter of the spool of tape on reel 12 is at the minimum providing maximum torque. Assuming that a constant level of voltage is applied to drive both of the motors 18 and 20, the shaft of motor 20 will rotate at the maximum angular velocity under these conditions. As tape is transferred from reel 10 to reel 12, the moment the spool of tape wound on reel 10 will decrease, increasing the effect of the braking action the moment on reel 12 will increase, effectively decreasing the driving force. At such time as substantially all of the tape has been transferred from reel 10 to reel 12, the angular velocity of reel 12 will be at a minimum. The velocity of the tape being transferred will, accordingly, be more nearly constant than if a constant spindle speed was provided.

Figure 2:
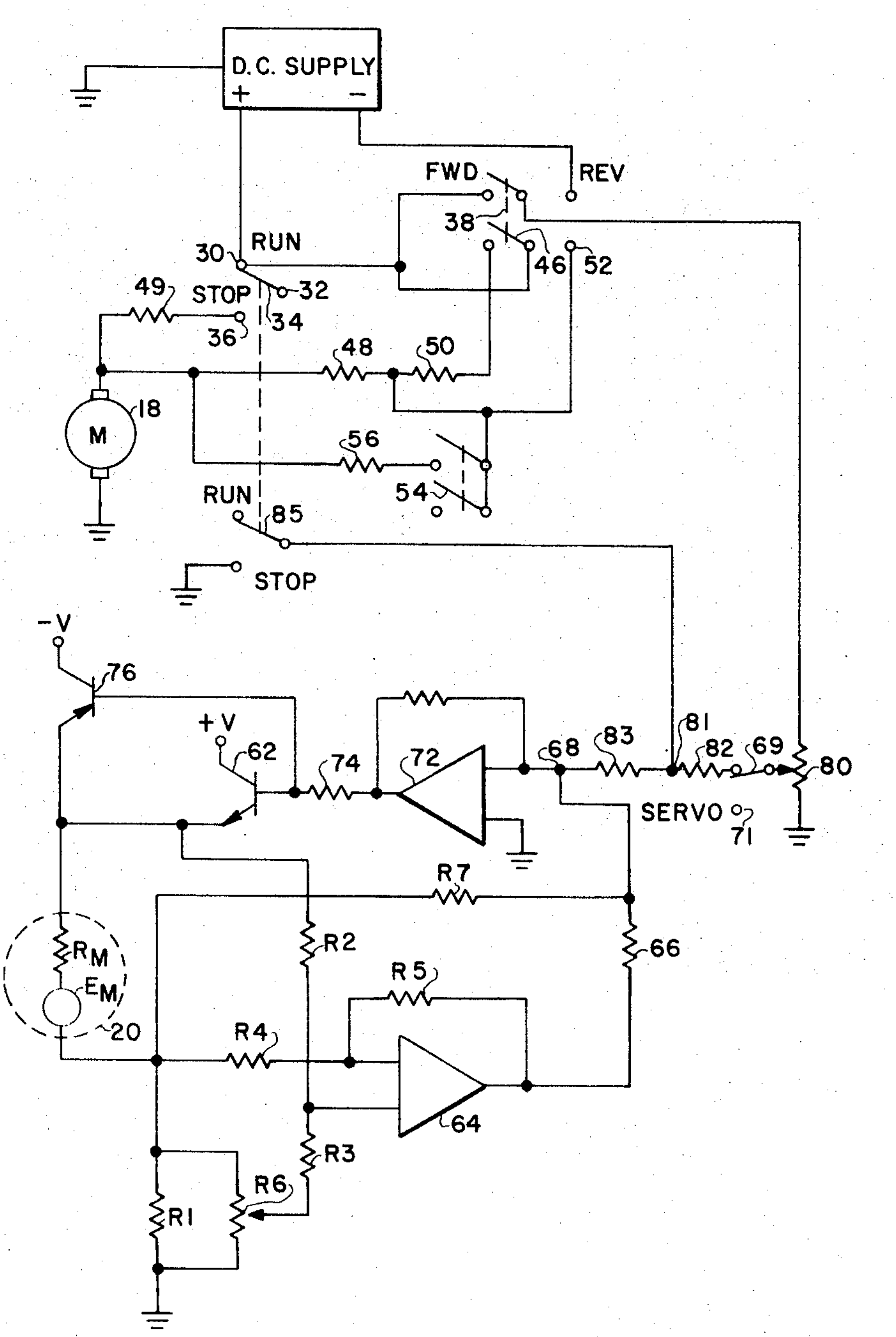
FIG. 2 is a schematic diagram illustrating a control circuit in accordance with one embodiment of the invention.

A control circuit as shown in FIG. 2 of the drawings can be used if a more precise, constant spindle speed is required. In the circuit of FIG. 2, the motor 20 is represented schematically as including armature resistance RM and a generator which produces a voltage EM which is a function of the rotational speed of the motor. A PNP transistor 62 is connected in series with the motor and a resistor $R_1$ with the collector of transistor 62 being connected to the source of positive potential. A variable resistor $R_6$ is connected in parallel with the resistor $R_1$ with the tap of the resistor being connected across the motor terminals through resistors $R_2$ and $R_3$. The junction between resistors $R_2$ and $R_3$ is connected to one input of differential amplifiers 64. The juncture between resistor $R_1$ and the motor 20 is connected through resistor $R_4$ to the other input of differential amplifier 64. Feedback resistor $R_5$ is connected across the amplifier 64. The output of amplifier 64 is a voltage $V_C$ which is a function of the difference between voltage appearing across the motor and voltage appearing across the series circuit comprising the motor 20 and resistor $R_1$. By choosing the gain of amplifier 64 to be equal to the ratio of resistor $R_1$ as compared to the armature resistance $R_M$, the voltage $V_C$ will be a direct function of the back EMF produced by the motor and, accordingly, a function of the speed of the motor. Voltage $V_C$ produced at the output of amplifier 64 is applied through summing resistor 66 to a summing junction 68. The summing junction 68 is applied to one input of amplifier 72. The output of amplifier 72 is connected through current limiting resistor 74 to supply base current to the transistor 62 and to an NPN transistor 76. The collector of NPN transistor 76 is connected to a source of negative supply voltage and its emitter is connected to the emitter of transistor 62, such that the motor 20 and resistor $R_1$ are connected through the emitter collector circuit of transistor 76 across the source of negative potential.

The tap of potentiometer 80 is connected through summing resistors 82 and 83 to summing junction 68. The polarity of the potential applied to potentiometer 80 from the d.c. supply through reversing switch 38 determines the direction of rotation of the motor 20. For example, the potential applied to terminal 80 can be a negative voltage when motor 20 is to be driven in clockwise direction to transfer tape from reel 12 to reel 10 (reverse) and positive when motor 20 is to be driven in a counterclockwise direction to transfer tape from reel 10 to reel 12. (forward). Thus, assuming that the potential applied to terminal 80 is negative, motor 20 will rotate in a clockwise direction and the voltage $V_C$ will be positive. If the resistance of resistor 66 is equal to the sum of the resistance of resistors 82 and 83, the potential $V_D$ applied to the input of amplifier 72 will be of an amplitude proportional to the difference in amplitude of the reference potential supplied at the top of potentiometer 80, which controls speed, and the voltage $V_C$ and of a negative polarity when the motor is turning at less than the desired speed. The output of amplifier 72 will be positive, causing transistor 62 to be bias to a conductive state and supplying power to drive the motor 20 in the clockwise direction. When the motor 20 attains the desired speed, voltage $V_D$ will become zero causing transistor 62 to be biased off. It is important to note that if the amplifier 72 has a very high gain even small difference signals $V_D$ will cause the transistor 62 to be biased to a highly conductive state. In the event the speed of the motor 20 becomes in excess of that desired, voltage $V_C$ will become greater than the reference voltage applied at terminal 80 causing voltage $V_D$ to become positive resulting in a negative output from amplifier 72. When the output of amplifier 72 is negative, transistor 62 will be biased off and transistor 76 will be biased on, supplying current to the motor of a polarity to cause the motor to tend to rotate in an opposite direction, effectively braking the motor until the speed drops to the desired constant speed level.

If the motor 20 is to be driven in the counterclockwise direction, the potential applied to terminal 80 as a reference voltage will be positive and at speeds below the desired constant spindle speed, transistor 76 will be biased conductive with the transistor 62 only being biased conductive when the speed of the motor becomes in excess of the desired speed or when the transistor 2 functions to provide a braking action when the reference potential is removed. Resistor $R_7$ provides current feedback to allow motor current to be proportional to amplifier input voltage $V_D$.

It is important to note that when the start-stop switch 34 is in the stop position, the voltage at point 81 is connected to ground through armature 85 of switch 34. The output of amplifier 72 will become of a polarity to cause current to flow through the motor in a direction to stop the motor.

Figure 3:
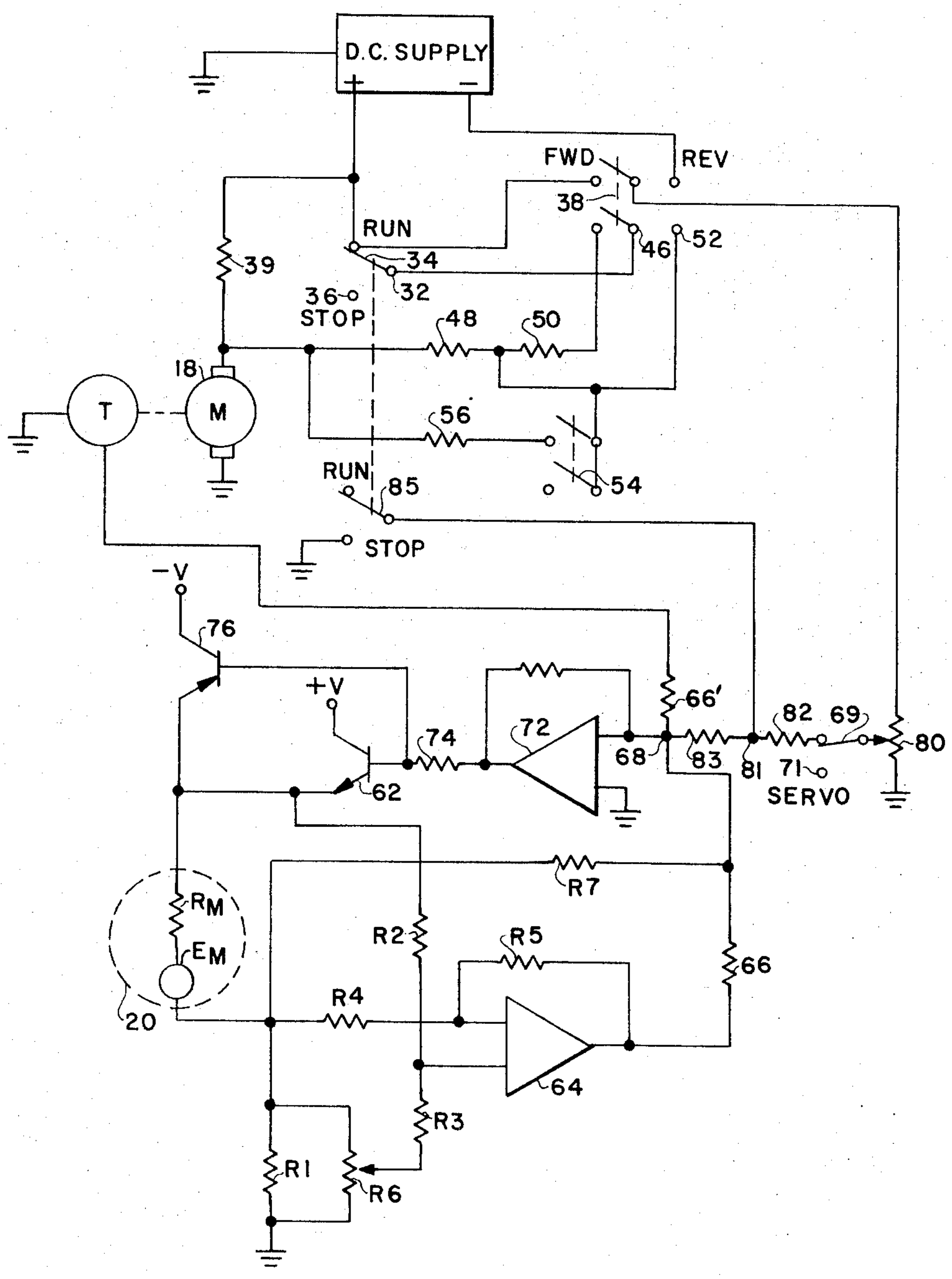
FIG. 3 is a schematic diagram illustrating a control circuit in accordance with another embodiment of the invention.

In those instances wherein a constant tape speed rather than a constant tape spindle speed is desired, a control circuit as shown in FIG. 3 of the drawings can be used. The circuit of FIG. 3 can be seen to be substantially the same as that of FIG. 2 with respect to motor 20. There can be also associated with the motor 18 a back EMF sensing circuit substantially identical to that associated with motor 20 which produces a voltage $V_C$ which is a function of the speed of motor 18. Preferably, however, motor 18 drives a tachometer 67 which produces the potential $V_C$ which is a function of speed of motor 18. Potential $V_C$ is applied through summing resistor 66' to the summing junction 68. As the sum of the speeds of the two motors 18 and 20 is very nearly constant for a constant tape speed, the motor 20 will be driven at different speeds as tape is transferred between the two reels to cause the linear speed of the tape to be substantially constant. In practice, using standard cassettes, it has been found that the tape speed will be constant within plus or minus 12 percent.

Figure 4:
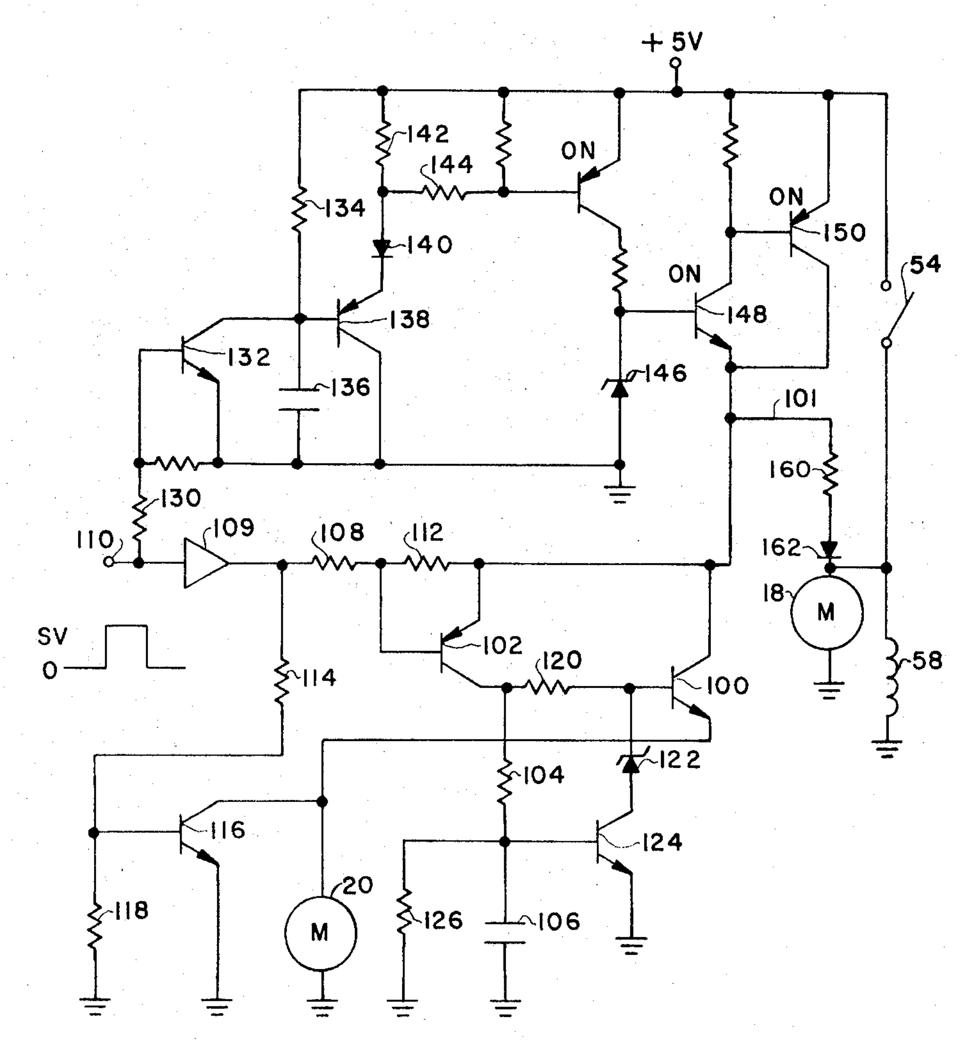
FIG. 4 is a schematic diagram illustrating an embodiment of the invention especially adapted for incrementally driven decks.

It is often desirable when using a cassette type tape recorder for recording of digital data to drive the tape incrementally. Thus, when data is to be recorded or read, tape would be transferred only for the period of time in which the read or write operation occurs. Incremental operation of the system in accordance with the present invention can be obtained by applying operating switch 69 to the servo position and applying to the servo input terminal 71 pulses of a polarity to produce the desired direction of rotation, of an amplitude to produce the desired speed and of a duration to cause sufficient tape to be transferred to accomodate the data being recorded or read.

Where simpler control circuits for incremental operation are required, one such as is shown in FIG. 4 of the drawings can be used. The circuit of FIG. 4 provides incremental drive only when tape is being transferred from reel 10 to reel 12. Simplified circuits can be used if the magnetic coding and decoding of the tape data permits speed and data density recordings to be used.

Referring now to FIG. 4 of the drawings, the motor 20 is connected through the emitter collector electrodes of a transistor 100 to bus 101. It will be noted that in this specific example of the invention the motor 20 rotates to drive the reel 12 in a counterclockwise direction when a positive voltage is applied to the motor. There is also provided transistor 102 whose emitter is connected to a bus 101 and whose collector is connected through a resistor 104 and a capacitor 106 to ground. The base of transistor 102 is connected through resistor 108 and inverting amplifier 109 to a terminal 110 with a biasing resistor 112 connected across the base emitter circuit of the transistor. Terminal 110 is also connected through resistor 114 to the base of transistor 116 whose emitter collector circuit is connected in shunt with motor 20. Biasing resistor 118 is connected across the base emitter circuit of transistor 116. The collector of transistor 102 is also connected through a resistor 120 to the base of transistor 100 with the base of transistor 100 being connected through a zener diode 122 and the emitter collector circuit of transistor 124 to ground. The base of transistor 124 is connected to the juncture between resistor 104 and capacity 106 with a biasing resistor 126 being connected across the base emitter circuit of transistor 124.

Terminal 110 is also connected through resistor 130 to the base of transistor 132 whose emitter is connected to ground and whose collector is connected through resistor 134 to supply voltage, suitably +5V, through capacitor 136 to ground and to the base of transistory 138. The collector of transistor 138 is connected to ground and its emitter is connected to supply voltage through diode 140 and resistor 142. The juncture between diode 140 and resistor 142 is connected to the base of transistor 142 through resistor 144 and zener diode 146 to ground. The juncture between resistor 144 and diode 146 connects to the base of transistor 148 which is one of a darlington pair including transistor 150 connected between supply and bus 101.

Figure 5:
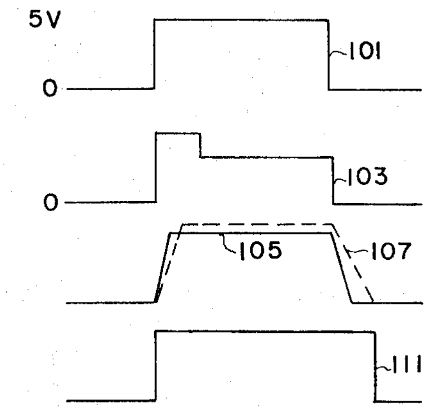
FIG. 5 is a group of curves illustrating the operation of the circuit of FIG. 4.

If a positive going pulse, which suitably has a peak amplitude of 5V as shown in Curve 101 of FIG. 5, is applied to terminal 110, transistor 132 will be biased on. Capacitor 136 will discharge rapidly, biasing transistor 138 on when transistor 138 turns on, transistor 142, 148 and 150 will each be biased on. At the end of the pulse applied to terminal 110, transistor 132 will turn off and capacitor will charge through resistor 134. When capacitor 136 is charged to a level sufficient to bias transistor 138 off, transistors 142, 148 and 150 will be biased off. The pulse of voltage applied to bus 101 will be larger than the pulse applied to terminal 110 as shown in Curve 111 of FIG. 5.

The going pulse applied to terminal 110 is inverted by amplifier 109 and causes transistor 116 to be biased off and transistor 102 to be biased on. When transistor 102 is biased on, transistor 100 will be biased into saturation causing the voltage applied to motor 20 initially to be approximately 5 V as shown in Curve 103 of FIG. 5. Also, when transistor 102 is biased on, capacitor 106 will commence to charge through resistor 104 and the emitter collector circuit of transistor 102. After a relatively short period of time, the capacitor 106 will be charged to a potential sufficient to bias transistor 124 on. When transistor 124 is biased on, the potential appearing at the base of transistor 102 will drop to a level established by the zener voltage of zener diode 122, suitably in the order of 3 volts. The transistor 100 will be rendered less conductive producing the amount of voltage applied to the motor 20 for the remainder of the duration of the pulse shown as curve 103. A t the end of the pulse applied to terminal 110, transistor 116 is biased on shorting across the motor and providing dynamic braking of the motor. Referring to curve 105, the curve illustrating the speed of the motor is shown with the curve 107 shown in phantom illustrating the speed characteristics if the pulse as shown in curve 101 is merely applied to drive transistor 100 to supply power to the motor. It can readily be seen that as a result of the provision of the initial increased voltage to the motor, the motor accelerates to the desired speed much quicker. Further, at the end of the pulse, deceleration of the motor is attained much quicker as a result of the dynamic braking provided by transistor 116. It is readily apparent that the speed required for reading or writing of information is attained much quicker and that there is substantially less wasted tape at the end of the pulse resulting in increased tape utilization.

It is important to note that the pulse shown in curve 111 lasts past the time at which motor 20 stops and continues to be applied to motor 18 through resistor 160 and diode 162 permitting motor 18 to pick up any slack tape. For fast rewind switch 54 is closed, maximum power is supplied to motor 18 and solenoid 58 is operated, as described with reference to FIG. 1.

Incrementing can be closely connected to both the reading and writing of data. It is feasible to apply a run pulse when data is available for writing and to initiate the write operation after small time intervals for the tape to attain its constant speed. The motor can be stopped as soon as the data is written closely tying the incrementing action to the write operation and rendering it feasible to record data at a rate at which it is prepared. The density of data recorded from irregular data sources is thereby increased. During a read operation, the motor can be started immediately before the read operation and then the motor stopped after reading is complete. As mentioned before, fast starting and stopping of the motor contributes to increased data density on the recording medium.

It will be further apparent that the angular rotation of the motor will be substantially constant for each bit of data recorded even though there will be some variance in the amount of space on the tape occupied by the bit. The number of recorded bits remains constant with each revolution and a measure of data recorded can be obtained from the number of spindle revolutions and, conversely, a count of the number of spindle rotations can be used to meter data and to index the tape. A count of the angular rotation can be obtained, for example, by using a detector as described with reference to FIG. 1 of the drawings. Further, it is possible to set the counter such that when the tape is moved in the forward direction, a counter will advance from zero, but when the motor is driven to transfer tape in a reverse direction, the counter will subtract from a previously obtained count in order that a measure of the tape position can be obtained. It will be noted that cams or devices other than the photosensitive system described diagrammatically can be used for driving a counter in accordance with the revolutions traversed by the motor or the reel. An important advantage of a system operated as described above is that error correction is possible even without read and decode circuits as the tape may be pulled backward using the counter as a guide until the gap ahead of the block of data in question is reached. This block of data can then be overwritten for the purpose of correcting errors.

Although the invention has been described in reference to particular preferred embodiments thereof, many changes and modifications will become apparent to those skilled in the art in view of the foregoing description which is intended to be illustrative and not limiting of the invention defined in the appended claims.

What is claimed is:

1. A magnetic tape transfer system comprising:
   a. first and second motors for driving first and second tape storage reels respectively;
   b. means for connecting said first motor to drive said first tape storage reel in a first direction tending to transfer tape in a first direction toward said first tape storage reel from said second tape storage reel,
   c. means for connecting said second motor to drive said second tape storage reel at a lower speed and with greater force than that which the first motor tends to drive the first tape storage reel whereby the direction and rate at which tape is transferred between said first and second tape storage reels is a function of the direction of rotation and angular velocity of the second motor; and
   d. means for selectively controlling said second motor to rotate in first and second directions.

2. A system as defined in claim 1 wherein said first motor is connected directly to said first material transfer device.

3. A system as defined in claim 1 including rewind means for selectively disconnecting said second motor from said second reel during rewind.

4. A system as defined in claim 3 further including means for supplying a higher power level to the first motor during rewind.

5. A system as defined in claim 1 including means for supplying power to said first motor at a lower level when material is transferred under control of said second motor in an opposite direction than when material is transferred in the first direction.

6. A system as defined in claim 1 including control means for supplying power to said second motor only during controlled time intervals.

7. A system as defined in claim 6 wherein said control means controls power supplied to said second motor to be at a higher level during an initial portion of each of said time intervals than during the intermediate portions thereof to provide acceleration to said motor.

8. A system as defined in claim 6 wherein said control means shunts said second motor at the end of each of said time intervals to decelerate said second motor.

9. A system as defined in claim 6 wherein said control means supplies power to said first motor during said controlled time interval and for at least a period following each of said time intervals sufficient to remove slack from said tape.

10. A system as defined in claim 1 including control means for driving said second motor at a constant angular velocity.

11. A system as defined in claim 1 including control means for driving said second motor to produce a substantially constant linear velocity of material transferred.

12. A system as defined in claim 1 further including means for providing an indication which is a function of the angular displacement of one of said reels from a reference position.

13. A system as defined in claim 12 wherein said means for providing an indication comprises a counter.

14. A magnetic tape transfer system comprising:
   a. first and second motors for driving first and second tape storage reels respectively;
   b. means for connecting said first motor to drive said first tape storage reel in a first direction tending to transfer tape in a first direction toward said first tape storage reel from said second tape storage reel;
   c. means for connecting said second motor to drive said second tape storage reel with greater force than that which the first motor tends to drive the first tape storage reel whereby the direction and rate at which tape is transferred between said first and second tape storage reels is a function of the direction of rotation and angular velocity of the second motor; and
   d. control means for supplying power to said second motor only during controlled time intervals and controlling the power supplied to said second motor to be at a higher level during an initial portion of each of said time intervals than during the intermediate portion thereof to provide acceleration to said motor.

15. A system as defined in claim 14 wherein said control means shunts said second motor at the end of each of said time intervals to decelerate said second motor.

16. A magnetic tape transfer system comprising:
   a. first and second motors for driving first and second tape storage reels respectively;
   b. means for connecting said first motor to drive said first tape storage reel in a first direction tending to transfer tape in a first direction toward said first tape storage reel from said second tape storage reel;
   c. means for connecting said second motor to drive said second tape storage reel with greater force than that which the first motor tends to drive the first tape storage reel whereby the direction and rate at which tape is transferred between said first and second tape storage reels is a function of the direction of rotation and angular velocity of the second motor; and
   d. control means for supplying power to said second motor only during controlled time intervals and for supplying power to said first motor during said controlled time intervals and for at least a period following each of said time intervals sufficient to remove slack from the tape.

17. A magnetic tape transfer system comprising:
   a. first and second motors for driving first and second tape storage reels respectively;
   b. means for connecting said first motor to drive said first tape storage reel in a first direction tending to transfer tape in a first direction toward said first tape storage reel from said second tape storage reel;

c. means for connecting said second motor to drive said second tape storage reel at a lower speed and with greater force than that which the first motor tends to drive the first tape storage reel whereby the direction and rate at which tape is transferred between said first and second tape storage reels is a function of the direction of rotation and angular velocity of the second motor; and d. control means for controlling the power supplied to said second motor to control the rate at which tape is transferred from the first reel to the second reel.

* * * * *